WARNER & REDSTREAKE.
Gas Purifier.
No. 57,020. Patented Aug. 7, 1866.
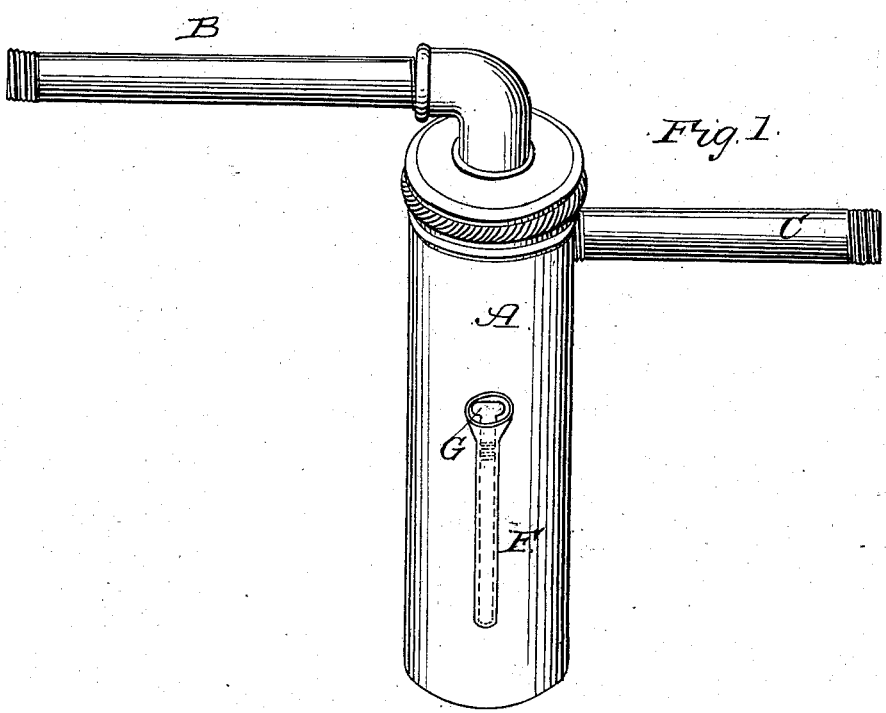
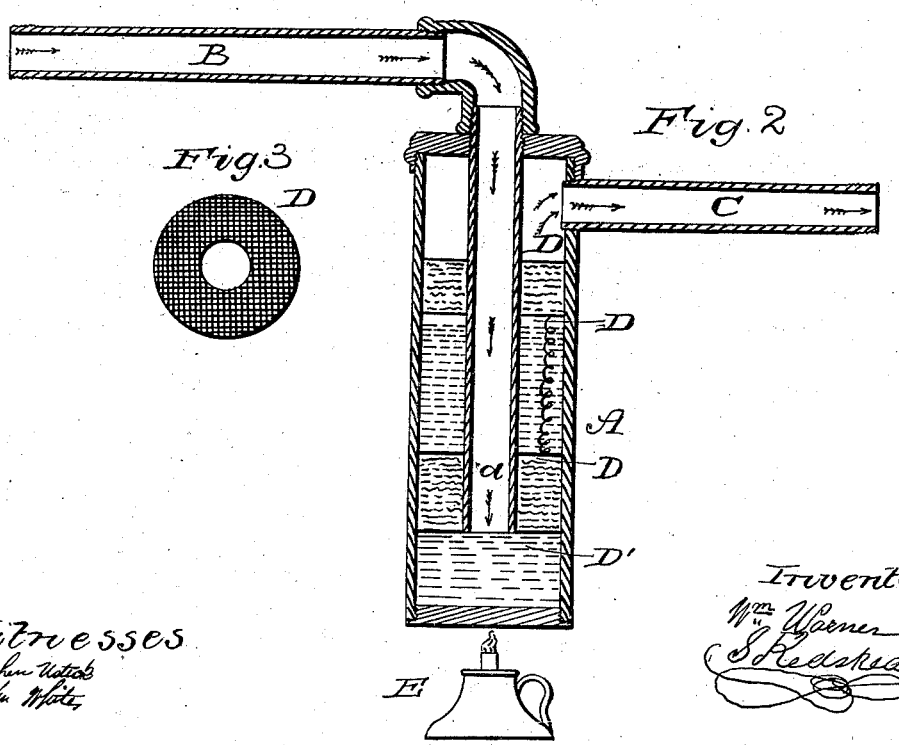

UNITED STATES PATENT OFFICE.

WM. WARNER AND E. S. REDSTREAKE, OF PHILADELPHIA, PENNSYLVANIA.

IMPROVED GAS APPARATUS.

Specification forming part of Letters Patent No. 57,020, dated August 7, 1866.

*To all whom it may concern:*

Be it known that we, WILLIAM WARNER and EDWARD S. REDSTREAKE, of the city and county of Philadelphia, and State of Pennsylvania, have invented a new and Improved Apparatus for Purifying and Regulating Gas; and we do hereby declare that the following is a full and exact description thereof, reference being had to the accompanying drawings, and to the letters of reference marked thereon.

The nature of our invention and improvement consists in an apparatus for purifying gas for illuminating purposes, which apparatus is constructed and operated substantially as follows.

In the accompanying drawings, Figure 1 is a perspective view of the apparatus. Fig. 2 is a vertical section of the same. Fig. 3 is a view of one of the wire-cloth pieces D.

Like letters in all the figures indicate the same parts.

A is a vessel which contains the purifying materials. B is the induction-pipe, leading from the meter and communicating, with its vertical end $a$, with the interior of the vessel A, near the bottom of the same. C is the main pipe, which communicates with all the burners of the building or other places supplied with gas from the meter.

There are disks D D and D D fast to and surrounding the vertical portion $a$ of the induction-pipe B. Between each pair a body of sand, lime, or other filtering media is held, the disks being made of wire-cloth or other open material, which, while it holds the filtering media in position, allows the gas to pass freely through in its ascent from the bottom of the vessel A. One of these disks is represented detached from the apparatus in Fig. 3.

We provide for the expansion and contraction of the pairs of disks D D and D D by holding them together by means of one or more spiral or other springs, the ends of which are secured to the disks respectively, so as to accommodate them to the fluctuations of the pressure of the gas.

The lower portion of the vessel A, except that occupied between the lower pair of disks D D, is filled with oil for purifying the gas in its ascent, the oil being heated by the lamp E beneath the vessel A, or in any other convenient manner.

For replenishing the oil in the vessel A there is a vertical tube, F, which communicates at its lower end with the interior of said vessel. The tube F is closed by means of the screw-plug G or a suitable stop-cock or other convenient device.

We have represented the vessel A of cylindrical form; but in practice we shall adopt any convenient form and mode of construction.

The operation is as follows: Before the gas is turned on from the meter the oil in the vessel A, by means of the lamp E, is brought partially into a state of vapor by sufficiently heating the bottom of said vessel. Then the communication is opened between the burners and the meter in the ordinary manner, and the gas, pressing forward in the direction of the arrows, flows through the induction-pipe B, and into the bottom of the vessel A, and passing through the bodies of oil and sand in its ascending course, has particles of air contained in it and other impurities separated therefrom before it enters the main pipe C, which communicates with all the burners. The gas being thus purified consequently gives increased light. The amount of gas is also increased by its passage through the vaporized oil, a certain portion of it being generated into gas and mixing with the current which flows from the meter, by the action of the lamp E or other heater, as described, or, in other words, decreasing the gas bill to consumers for the amount of gas which passes through the meter.

Having thus fully described our improved apparatus for purifying gas, what we claim therein as new, and desire to secure by Letters Patent, is—

1. The combination of spiral or other springs with the disks D D and D D, arranged and operating substantially in the manner and for the purpose above set forth.

2. The combination of the induction-pipes B $a$, exit-pipe C, and disks D with the vessel A, the whole being constructed and arranged in relation to each other for joint operation, substantially as described, and for the purposes specified.

In testimony that the above is our invention we hereunto set our hands and affix our seals this 14th day of April, 1866.

WM. WARNER. [L. S.]
  E. S. REDSTREAKE. [L. S.]

Witnesses:
 STEPHEN USTICK,
 JOHN WHITE.